US010769624B1

(12) United States Patent
Gonzalez et al.

(10) Patent No.: US 10,769,624 B1
(45) Date of Patent: Sep. 8, 2020

(54) METHODS AND SYSTEMS FOR RE-PROVISIONING A MOBILE WALLET

(75) Inventors: Richard C. Gonzalez, San Antonio, TX (US); Maximiliano C. Juarez, Helotes, TX (US); Christina N. Nickel, Boerne, TX (US); Richard R. Rohrbough, Boerne, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 1376 days.

(21) Appl. No.: 13/447,698

(22) Filed: Apr. 16, 2012

Related U.S. Application Data

(60) Provisional application No. 61/476,073, filed on Apr. 15, 2011.

(51) Int. Cl.
*H04N 21/20* (2011.01)
*G06Q 20/38* (2012.01)
*G06Q 20/32* (2012.01)

(52) U.S. Cl.
CPC ....... *G06Q 20/382* (2013.01); *G06Q 20/3226* (2013.01)

(58) Field of Classification Search
CPC ................................................. G06Q 20/3829
USPC .......................................................... 705/69
See application file for complete search history.

(56) References Cited

U.S. PATENT DOCUMENTS

| 6,636,833 | B1* | 10/2003 | Flitcroft | G06Q 20/00 235/380 |
|---|---|---|---|---|
| 7,822,688 | B2 | 10/2010 | Labrou et al. | |
| 8,019,365 | B2 | 9/2011 | Fisher | |
| 8,041,338 | B2 | 10/2011 | Chen et al. | |
| 8,121,945 | B2 | 2/2012 | Rackley et al. | |
| 2002/0152180 | A1* | 10/2002 | Turgeon | G06Q 20/04 705/72 |
| 2004/0039919 | A1* | 2/2004 | Takayama | G06Q 20/04 713/180 |
| 2004/0089711 | A1* | 5/2004 | Sandru | G06Q 20/042 235/379 |
| 2004/0148525 | A1* | 7/2004 | Aida | G06F 8/61 726/28 |
| 2006/0259469 | A1* | 11/2006 | Chiu | G06Q 30/02 |
| 2007/0045403 | A1* | 3/2007 | Slonecker, Jr. | G06Q 20/354 235/380 |

(Continued)

OTHER PUBLICATIONS

Ron White, How Computers Work, Oct. 15, 2003, Que Publishing, 7th Ed, p. 4. (Year: 2003).*

*Primary Examiner* — Calvin L Hewitt, II
*Assistant Examiner* — Cristina Owen Sherr
(74) *Attorney, Agent, or Firm* — Perkins Coie LLP

(57) ABSTRACT

Methods and systems are provided for managing a mobile wallet. In some embodiments, a user may request re-provisioning of the payment instruments in a single user interaction. In accordance with embodiments of the invention, a method of managing a mobile wallet includes providing a downloadable application for enabling a mobile wallet on a user computing device, transmitting the application to the user computing device, receiving a request to enroll a plurality of payment instruments in the mobile wallet enrolling, the plurality of payment instruments in the mobile wallet, receiving a re-provisioning request, and re-provisioning at least a first group of the plurality payment instruments.

20 Claims, 7 Drawing Sheets

(56) References Cited

U.S. PATENT DOCUMENTS

| | | | |
|---|---|---|---|
| 2008/0041936 A1* | 2/2008 | Vawter | G06Q 20/3674 |
| | | | 235/380 |
| 2008/0078831 A1 | 4/2008 | Johnson et al. | |
| 2008/0208762 A1 | 8/2008 | Arthur et al. | |
| 2008/0263025 A1* | 10/2008 | Koran | G06Q 30/02 |
| 2010/0125495 A1 | 5/2010 | Smith et al. | |
| 2011/0057025 A1 | 3/2011 | Denzer et al. | |
| 2011/0218868 A1 | 9/2011 | Young et al. | |
| 2012/0029990 A1 | 2/2012 | Fisher | |
| 2012/0197740 A1* | 8/2012 | Grigg | G06Q 20/3278 |
| | | | 705/16 |

\* cited by examiner

METHODS AND SYSTEMS FOR RE-PROVISIONING A MOBILE WALLET

CROSS REFERENCE TO RELATED APPLICATIONS

This application claims priority to U.S. Provisional Patent Application No. 61/476,073, entitled "MOBILE FINANCIAL MANAGEMENT USING A MOBILE WALLET", which was filed on Apr. 15, 2011, the contents of which are incorporated by reference in its entirety herein.

TECHNICAL FIELD

The disclosed embodiments relate generally to mobile wallets. More specifically, the disclosed embodiments relate to managing payment instruments in mobile wallets.

BACKGROUND

Mobile wallets allow users to store payment instruments in a single location. Many times, mobile wallets contain payment instruments that are issued by various issuers. For example, the mobile wallet may contain an American Express® credit card, a USAA® credit card, and a gift card to Sam's Club®. Mobile wallets may be enabled on a mobile device associated with a user, with the various payment instruments provisioned to the mobile device. If the user obtains a new mobile device, payment instruments must be re-provisioned to the new mobile device, which generally requires user action to notify the issuing companies of the change. Therefore, when the user switches mobile devices, the user is required to make multiple requests (at least one to each issuer) to re-provision the payment instruments to the new mobile device. In some cases, the mobile device may have been compromised, putting the user's payment instruments at risk of unauthorized use.

BRIEF SUMMARY

Embodiments of the present invention provide various systems and methods for managing a mobile wallet. In accordance with various embodiments, a method of managing a mobile wallet includes: providing a downloadable application for enabling a mobile wallet on a user computing device; in response to a user request to download the application, transmitting the application to the user computing device; registering the user computing device by associating characteristics of the user computing device with an identifier associated with the user; receiving a request to enroll a plurality of payment instruments in the mobile wallet; enrolling the plurality of payment instruments in the mobile wallet where enrolling the plurality of payment instruments in the mobile wallet includes provisioning the plurality of payment instruments; receiving a re-provisioning request; and re-provisioning at least a first group of the plurality payment instruments. In some embodiments, enrolling includes receiving information from an existing payment instrument, which may include receiving an image of the existing payment instrument, extracting the information from the image, and recording the information.

In some embodiments, the provisioning the plurality of payment instruments includes documenting the plurality of payment instruments in a central repository and associating the plurality of payment instruments with the user computing device. In some embodiments, the re-provisioning at least a first group of the plurality payment instruments includes re-associating at least the first group of the plurality payment instruments with a second user computing device. In some embodiments, at least the first group of the payment instruments are canceled and reissued prior to being re-associated. Reissuing at least the first group of the plurality payment instruments may include mailing at least one physical payment instrument to the user. In other embodiments, re-provisioning at least a first group of the plurality of payment instrument includes canceling at least the first group of the plurality of payment instruments. In other embodiments, re-provisioning at least a first group of the plurality of payment instruments includes re-provisioning the plurality of the payment instruments in the mobile wallet.

In some embodiments, the method includes receiving a request to download the application to a second user computing device, and in response to the request, notifying the user, via the application, of the option to request re-provisioning of the plurality of payment instruments. In some embodiments, the request to download the application to a second user computing device identifies the second user computing device by at least in part comparing the characteristics of the registered device associated with the user to the characteristics of the second user computing device.

In some embodiments, the first group of the plurality of payment instruments includes payment instruments issued by a provider of the mobile wallet, and the method includes notifying issuers of a second group of the plurality of payment instruments of the re-provisioning request. In some embodiments, the first group of the plurality of payment instruments includes payment instruments issued by affiliated organizations of the provider of the mobile wallet. The affiliated organizations may include organizations having pre-negotiated agreements with the provider of the mobile wallet.

In some embodiments, the method includes receiving authorization and information to re-provision the plurality of payment instruments. In some embodiments, the re-provisioning request is received via a web browser. In some embodiments, the user includes a member of a membership organization and the membership organization is a provider of the mobile wallet. In some embodiments, at least one of the payment instruments has no physical counterpart.

BRIEF DESCRIPTION OF THE DRAWINGS

Embodiments of the present invention will be described and explained through the use of the accompanying drawings in which.

Figure 1:
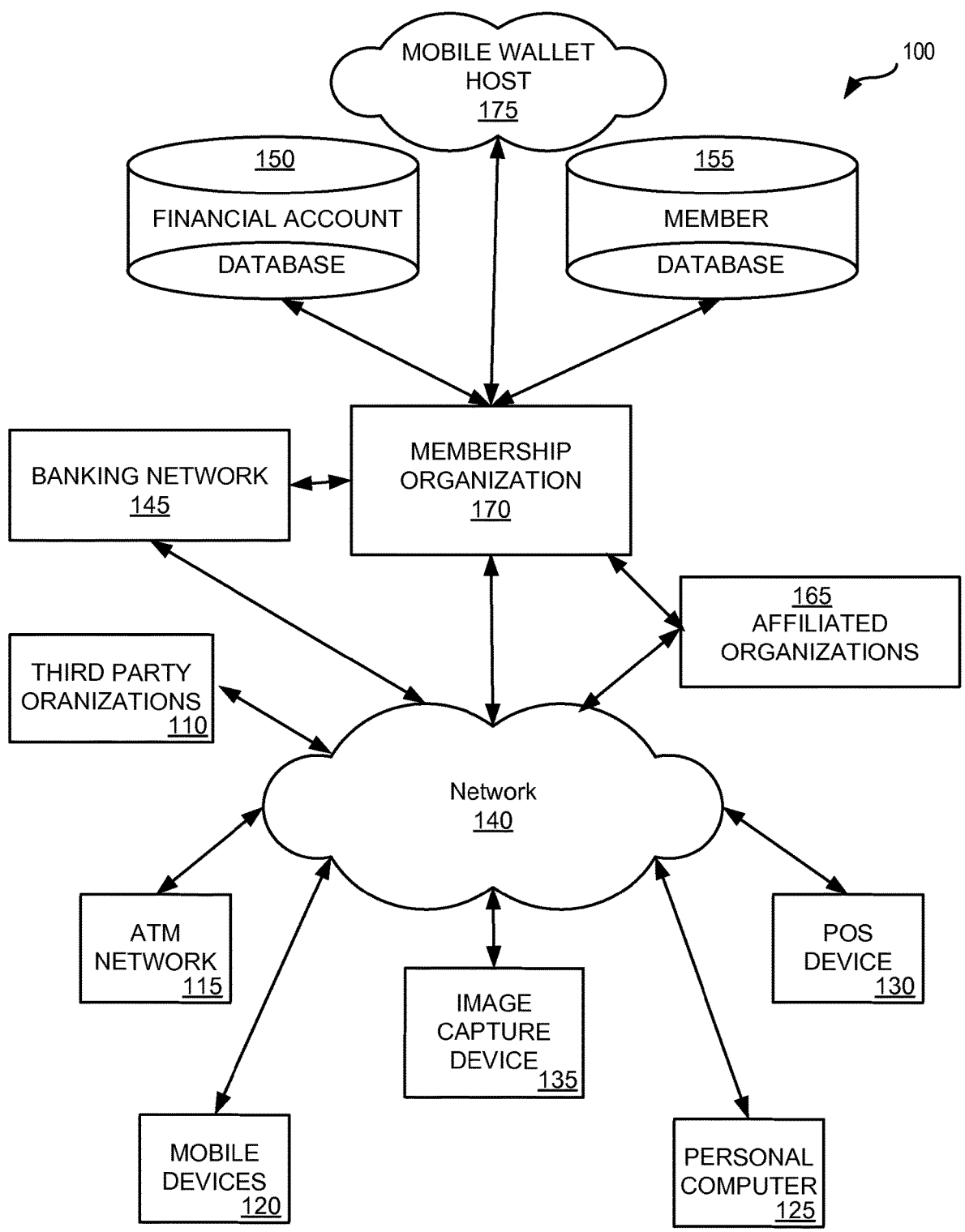
FIG. 1 illustrates an example of an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

A method of managing a mobile wallet is described. Mobile wallets may be enabled on a user computing device, such as a mobile device associated with a user, with the various payment instruments provisioned to the mobile device. Typically, when the user obtains a new or replacement mobile device, the payment instruments must be re-associated with the new mobile device for the user to make purchases with the new mobile device. In some cases, for example if the user's mobile device is compromised, the user may request that the payment instruments be canceled, and possibly reissued to eliminate the risk of unauthorized use of the mobile wallet. In the likely scenario that the mobile wallet contains payment instruments that are not issued by the same issuer, the user will need to contact each issuer to re-provision the payment instruments in the mobile wallet to the new mobile device. Depending on the number of issuers to be contacted, the re-provisioning process may be time consuming and inconvenient. The following disclosure includes methods and systems allowing the user to request and have an entire cadre of payment instruments in the mobile wallet re-provisioned with a single user interaction. In this disclosure, re-provisioning is used broadly to include canceling payment instruments, reissuing payment instruments, and re-associating payment instruments with a new mobile device. The re-associating may include provisioning payment instruments to a new user device.

The following is an overview of a method in which the user may request re-provisioning with a single user interaction. The user may download an application for enabling a mobile wallet on the user's mobile device. The user's mobile device may be registered with the provider of the mobile wallet by device fingerprinting or other methods and then associating the device with the user. After downloading the application, the user may request to enroll payment instruments into the mobile wallet. Information necessary to enroll the payment instruments is collected and the payment instruments are provisioned to the mobile device. When the user obtains a new mobile device the user may wish to have the payment instruments re-provisioned (canceled, re-issued, or re-associated with the new mobile device). The user downloads the mobile wallet application to the new mobile device. The provider of the mobile wallet may detect that mobile wallet application is being downloaded to a new mobile device by comparing the characteristics of the requesting device and the device associated with the user. The user may be asked, via the application, whether the user wants the payment instruments re-provisioned. If the user makes a re-provisioning request, the provider of the mobile wallet re-provisions the payment instruments that the provider of the mobile wallet is an issuer of, and those payment instruments that it has authority to re-provision (or at least make the request on behalf of the user). For example, the provider of the mobile wallet may have pre-negotiated arrangements with other issuers, and thus may re-provision payment instruments issued by other issuers. Or the user may have provided the necessary information and authorization for the provider of the mobile wallet to make the request for the user. The provider of the mobile wallet will notify issuers of payment instruments that the provider could not re-provision or make a request to re-provision of the user's re-provisioning request. Thus, the user will have made all necessary re-provisioning requests with a single user interaction.

As mentioned, the re-provisioning request may be a request to have the payment instruments re-associated with a new mobile device, for example if the user obtains a new mobile device. Or, the re-provisioning request may include a request to cancel the payment instruments. The canceling request may be desirable if the user's mobile device has been compromised and the user has not yet replaced the mobile device. Or the user may make a re-provisioning request to cancel the payment instruments, reissue the payment instruments, and re-associate the payment instruments to a new mobile device.

FIG. 1 illustrates an example of an operating environment 100 in which some embodiments of the present invention may be utilized. The embodiments of the present invention illustrated in FIG. 1 allow user interactions through various points of interaction such as, but not limited to ATM networks 115 (e.g., interbank ATM network and intrabank ATM networks), various user computing devices including but not limited to mobile devices 120 (e.g., mobile phone), which mobile devices typically have digital wallets, personal computers 125, point of sale (POS) devices 130, and image capture devices 135. These points of interaction can include mechanisms for generating, submitting and processing payments through network 140, which payments are submitted to banking network 145. The points of interaction may run one or more applications or clients that allow a user to interact with the banking network. Such applications may provide access to payment processing systems and interfaces along with traditional banking functionality such as withdrawals, balance inquiries, deposits, transfers, etc.

ATM networks 115 can be any set of ATMs in an interbank ATM network and/or intrabank ATM network. Mobile devices 120 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11a/b/g connection or mobile broadband connection, such as via a 3G or 4G wireless network). Personal computers 125 may be any computer (e.g., desktop computers, laptop computers, netbooks, tablet computers, Internet-enabled television devices, etc.) connected to network 140.

POS devices 130 can be any device used as a checkout or payment receiving mechanism for merchants or service providers such as a hospital, ambulance company, doctor, automobile repair shop, pharmacy, clothing store, and others. For example, POS device 130 can be a terminal located at a merchant location, a computer-based interface such as a webpage or custom application, a telephone payment system, and others.

Banking network 145 may include any number of membership organizations, banks, credit unions, or other financial institutions. In accordance with embodiments of the present invention, banking network 145 can use a variety of interaction methods, protocols, and systems. For example, banking network 145 can use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

Membership organization 170 may be any organization that provides certain financial services. For example, membership organization may provide banking, insurance, wealth management, and any of a number of other services. Membership organization may provide a mobile wallet to its members, which mobile wallet may be used as described herein.

Affiliated organizations 165 may be organizations with some affiliation with the membership organization 170. Affiliated organizations 165 may include organizations having pre-negotiated agreements with the membership organization 170. The pre-negotiated agreements may be related to provisioning and/or re-provisioning of payment instruments. In some embodiments, the affiliated organizations 165 issue payment instruments to the user that may be included in a mobile wallet.

Third party organizations 110 may be organizations with no affiliation with the membership organization 170. Third party organizations 110 may issue payment instruments to the user that may be included in a mobile wallet.

As illustrated in FIG. 1, membership organization 170 can be communicably coupled to one or more databases such as financial account database 150 and member database 155. These databases can have a variety of information that can be utilized by the membership organization. For example, financial account database 150 includes account information for members of the membership organization 170. Member database 155 stores information about members (or customers) of membership organization 170 (or financial institution). For example, membership database 155 can include information such as employer, total balance of all accounts held at the membership organization, credit ratings, home ownership information, annual salary, length of membership, and/or other information. In some embodiments, these two databases can be integrated into one database. A computer system associated with a membership organization, a bank, a credit union, or other financial institution within banking network 145 may be able to access these (and other) databases for account information, customer information, and other stored information.

FIG. 1 also depicts a mobile wallet host 175, which may host mobile wallets for access via the network by any of the points of interaction.

Figure 2:
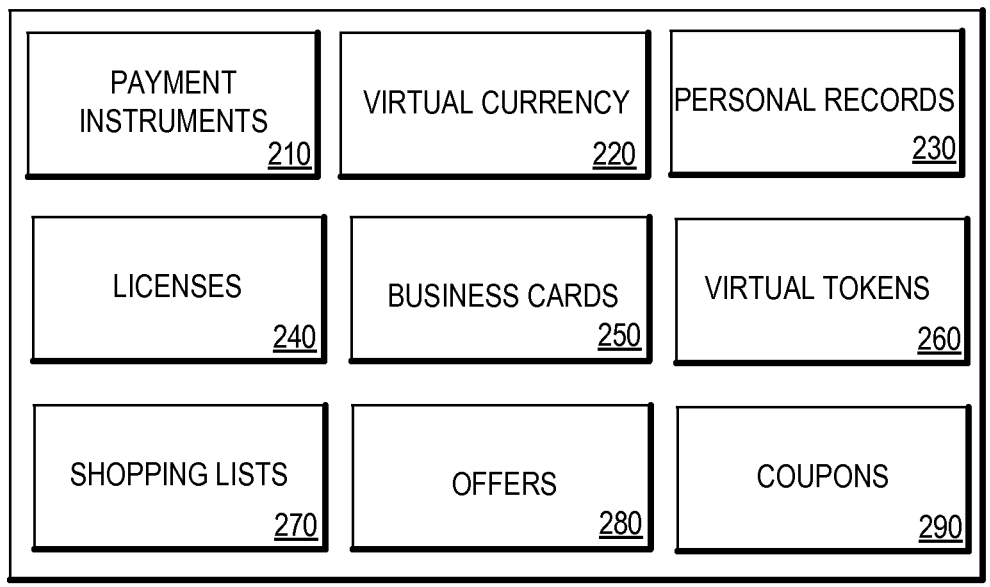
FIG. 2 is a block diagram illustrating exemplary components that may be included in a mobile financial wallet.

FIG. 2 depicts a block diagram illustrating exemplary components that can be included in a mobile wallet, which may be present in the various points of interaction, such as the mobile devices 120, or may be hosted by the mobile wallet host 175 in accordance with various embodiments of the present invention.

According to the embodiment shown in FIG. 2, the mobile wallet 200 can include payment instruments 210, such as virtual credit cards, debit cards, gift cards, and the like; virtual currency 220; personal records 230, such as medical records, personal property titles, and the like; licenses 240, such as drivers licenses employee IDs, military IDs, and the like; business cards 250; virtual tokens 260, such as public transit tokens or the like; shopping lists 270, which may include wish lists and the like; offers 280; and coupons 290. The payment instruments may include payment instruments from various issuers. The payment instruments 210 may include payment instruments 210 that are issued by a provider of the mobile wallet, issued by affiliated organizations 165, or issued by third party organizations 110. The payment instruments may or may not have physical counterparts (e.g., plastic credit cards).

Figure 3:
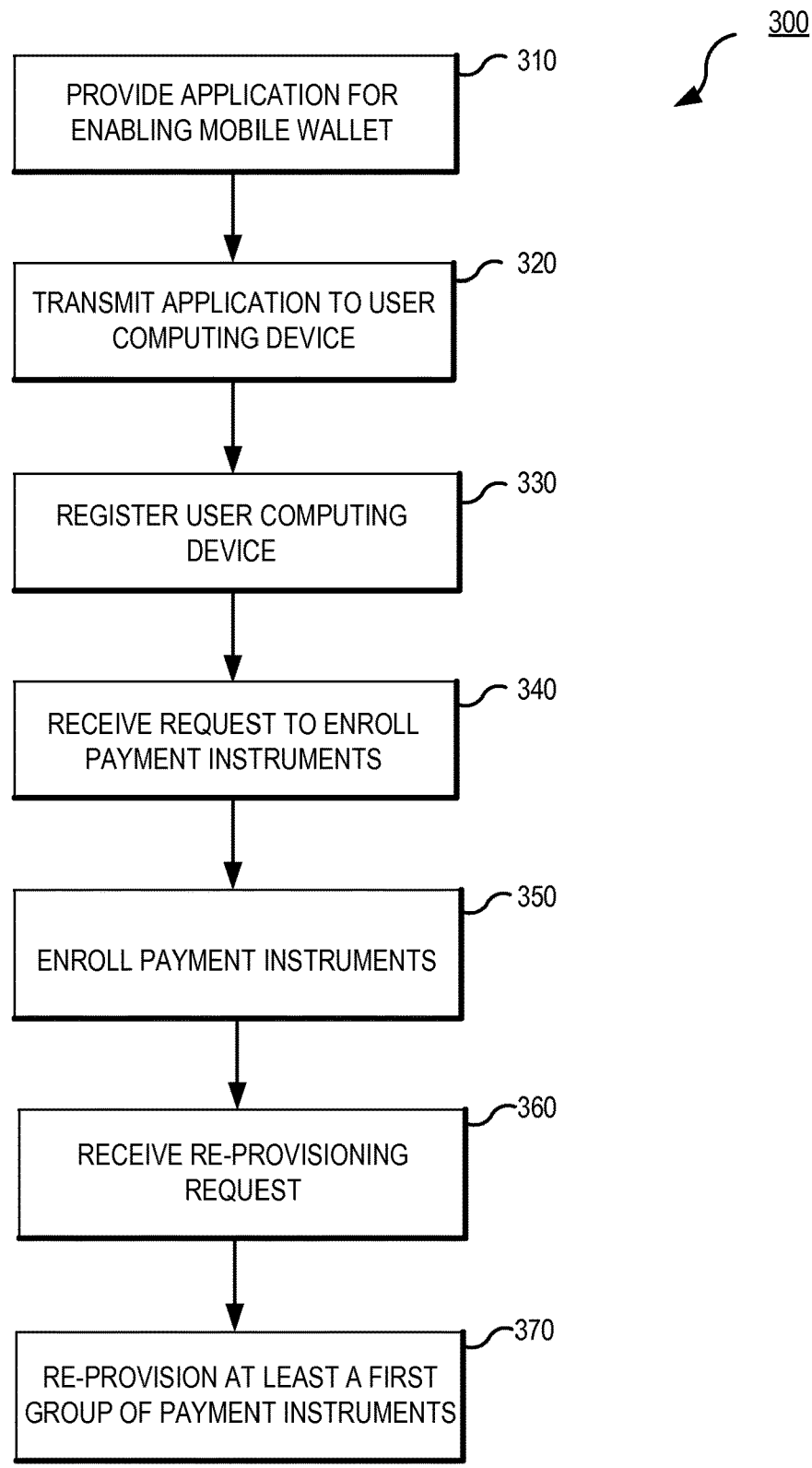
FIG. 3 is a flow chart illustrating a set of exemplary operations for managing a mobile financial wallet.

FIG. 3 is a flow chart illustrating a set of exemplary operations for managing a mobile financial wallet. In block 310, an application is provided for enabling a mobile wallet on a user computing device. The application may be published to a website accessible to users for example, or the application may be sent to the user via electronic mail, or by other means. In some embodiments, the mobile wallet application is provided by a membership organization to its members, and the membership organization provides the mobile wallet.

In block 320, in response to a user request to download the application to the user computing device, the application is transmitted to the user computing device. In some embodiments, the application and/or mobile wallet is stored in the secure element on a user computing device.

In block 330, the user computing device is registered. Registering the user device may include associating characteristics of the user computing device with an identifier associated with the user. The user computing device may be used as an authenticator for the mobile wallet in general and/or for each payment instrument. The characteristics of the mobile device may be collected from the user computer device and stored in a database to create a device fingerprint of the user computing device. The characteristics may be continually collected and the device fingerprint may be updated accordingly. The characteristics may include plug-ins, operating system, and browsing history, for example. The identifier associated with the user may be a membership identification number of the user.

In block 340, a request to enroll payment instruments in the mobile wallet is received.

In block 350, payment instruments are enrolled in the mobile wallet based on the user request. Enrolling may include receiving or collecting information about a payment instruments such as a credit card number, expiration date, and CVV. The information may be collected using various methods. For example, one or more images of a payment instrument may be provided, the information may be extracted from the images, and the information may be recorded in a database. The information may be associated with the user, mobile wallet, and/or user computing device. Enrolling may also include provisioning the payment instruments. Provisioning includes many different processes known in the art. For example, provisioning processes such as OTA (over the air) provisioning, internet-based provisioning, central issuance, and instant issuance applications. In some embodiments, the provisioning process includes documenting the payment instruments in a central repository and associating the payment instruments with the user computing device. The central repository may be a database, such as the membership database.

In block 360, a re-provisioning request is received from the user. The re-provisioning request may be received via an internet web browser, a telephone call, electronic mail, and text message, for example. The re-provisioning request may include a request to re-associate the payment instruments to the new user computing device. Re-associating may include provisioning the payment instruments to the new user computing device. In other embodiments, the re-provisioning request may include a request to cancel all payment instruments in the mobile wallet. In some embodiments, the user may include a request to cancel the payment instruments in the mobile wallet, reissue the payment instruments, and re-associate the payment instruments.

In some embodiments, certain user actions or information may identify that the user may require or desire re-provisioning of the payment instruments prior to the user requesting re-provisioning. For example, the provider of the mobile wallet application may receive a request to download the mobile wallet application to a new user computing device. In some embodiments, when the request is received, the provider may access a user profile to determine whether a user computing device is registered with the user or if the user has downloaded the application previously. The provider of the mobile wallet may compare the characteristics of the requesting user computing device with the characteristics of a registered user computing device to determine if the devices are the same. If it is determined that the request is from a new user computing device, then the provider of the mobile wallet may notify the user of the option to request re-provisioning of the payment instruments in the mobile wallet. The user may make a request to have all the payment instruments re-provisioned in a single user interaction.

In block 370, at least a first group of the payment instruments are re-provisioned. Notifications of the re-provisioning request may be sent to the issuers of any payment instrument in the mobile wallet that is not provisioned. The payment instruments of these issuers may comprise a second group of payment instruments, which in some examples are the remaining payment instruments. For example, the provider of the mobile wallet may not have the proper authorizations or information, such as security keys, to re-provision payment instruments issued by certain third party issuers, but notifications may be sent to these issuers on behalf of the user, relieving the user of the burden of contacting the issuer. In some embodiments, the entire cadre of payment instruments in the mobile wallet is re-provisioned, and thus no notifications are sent. In some embodiments, the first group of the payment instruments includes payment instruments issued by a provider of the mobile wallet. In other embodiments, the first group of the payment instruments further includes payment instruments issued by the provider of the mobile wallet and organizations that are affiliated with the provider of the mobile wallet.

In other embodiments, the user provides the appropriate information and authorization to the mobile wallet provider such that the mobile wallet provider may act on behalf of the user to fulfill a re-provisioning request to cancel the payment instrument, reissue the payment instrument, and/or re-associate with a new user computing device (provision payment instruments to a new device). For example, if the user provides logon and password information to the user's account, with permission to access, the mobile wallet provider may login to the account on behalf of the user and directly input the request. Using any of these methods, the user has successfully requested re-provisioning of all the payment instruments in the mobile wallet in a single user interaction and the user will not be required to contact each individual issuer to cancel, reissue, and/or have the payment instruments re-associated (provisioned) with the new user computing device.

Figure 4:
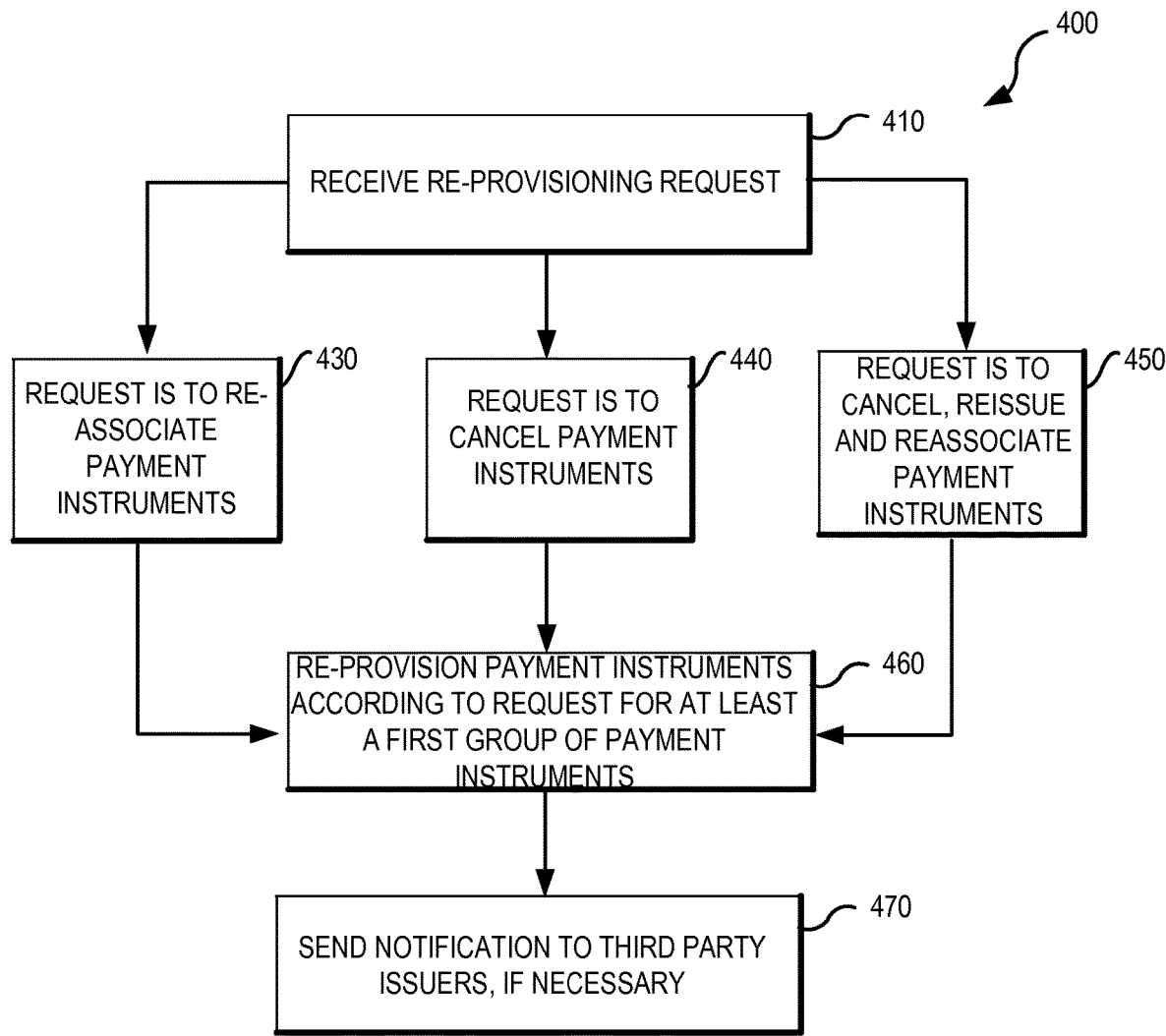
FIG. 4 is a flow chart illustrating a set of exemplary operations for managing a mobile financial wallet.

FIG. 4 is a flow chart illustrating a set of exemplary operations for managing a mobile financial wallet. In block 410, a request for re-provisioning is received. Blocks 430, 440, and 450 are exemplary requests that the user may make. In block 430, a request may include a request to re-associate the payment instruments with a new user computing device. This request may be desirable when a user simply acquires a new or replacement computing device and has no need to cancel all the payment devices or request a reissue of the payment devices. In block 440, a request may include a request to cancel the payment instruments in the mobile wallet. This type of request may be desirable in circumstances where the user has lost the user computing device but does not have a replacement user computing device. In block 450, the request may include a request to cancel all the payment instruments, reissue the payment instruments, and re-associate the payment instruments with a new user computing device (provision payment instruments to new device). This type of request may be desirable in circumstances where the user's computing device has been lost or compromised, and the user has a replacement user computing device and wishes to have the payment instruments provisioned on the replacement user computing device. If the user requests to have the payment instruments reissued, part of the reissuing may include mailing, or arranging for mailing, some or all of the physical payment instruments to the user.

In block 460, at least a first group of the payment instruments are re-provisioned according to the request, as discussed above in FIG. 3. In block 470, notification of the re-provisioning request is sent to third party issuers, if necessary. The notification may not be necessary where the user has provided all necessary information and authorization for a re-provisioning request to be made on behalf of the user, or if the other issuers are affiliated organizations.

Figure 5:
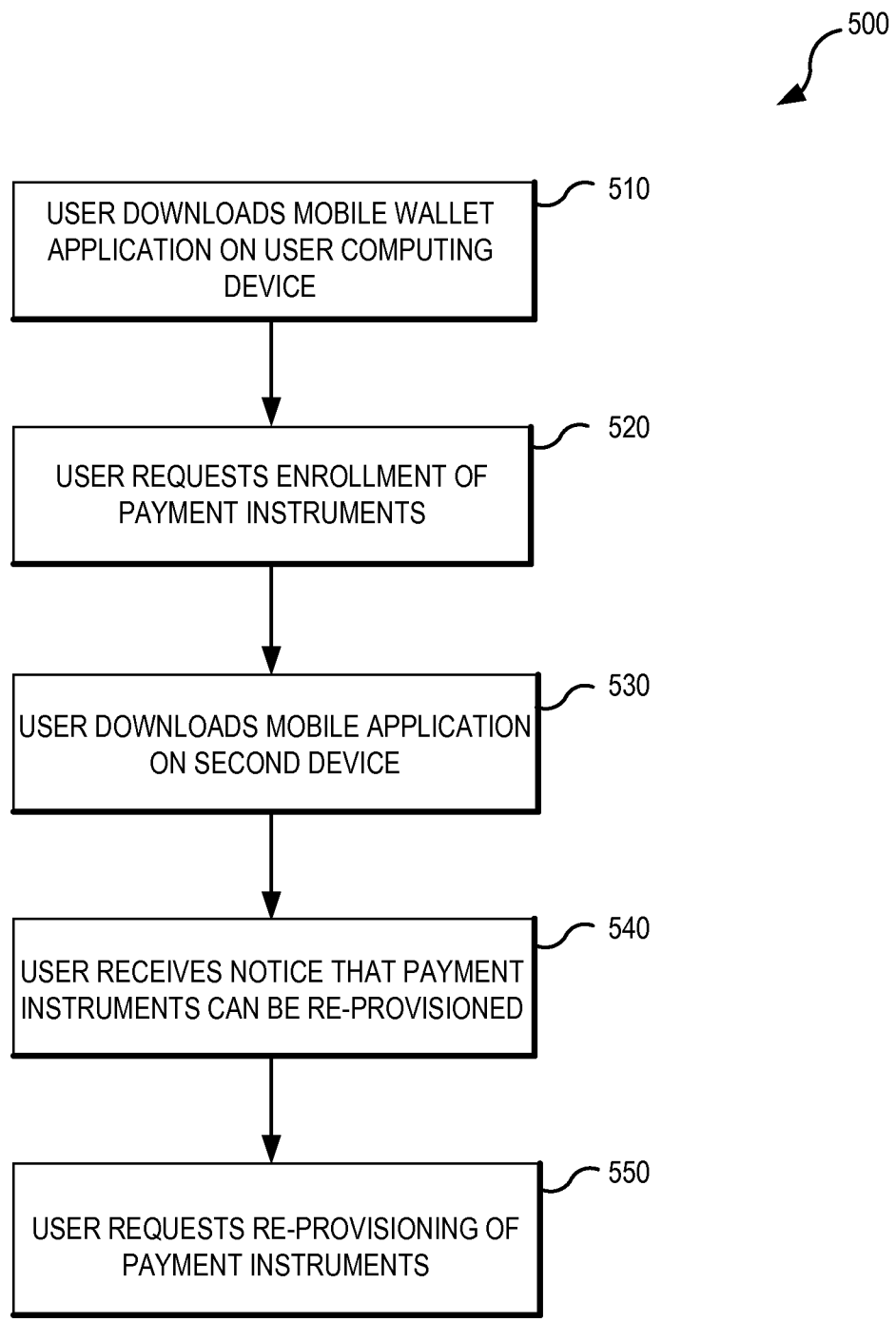
FIG. 5 is a flow chart illustrating a set of exemplary operations for managing a mobile financial wallet.

FIG. 5 is a flow chart illustrating a set of exemplary operations for managing a mobile financial wallet, from the perspective of a user. In block 510, the user downloads an application for enabling a mobile wallet on the user's computing device. In block 520, the user makes a request to enroll payment instruments in the mobile wallet. The user may be required to provide information about each of the payment instruments, such as a credit card number. The information may be provided many different ways, such as by typing the information on a keyboard to be submitted via a web browser, speaking to a customer service representative of the mobile wallet provider, or sending an image, or real-time video of the front and back of the payment instrument. In block 530, the user downloads the application onto a new user computing device. In block 540, the user receives a notice of the re-provisioning services. For example, the user may request to have the payment instruments associated with the registered or original user computing device canceled, reissued, and re-associated with the new computing device, among other choices. In block 550, the user sends a re-provisioning request. Thus, the user has requested that all the payment instruments be re-provisioned with a single user interaction.

Figure 6:
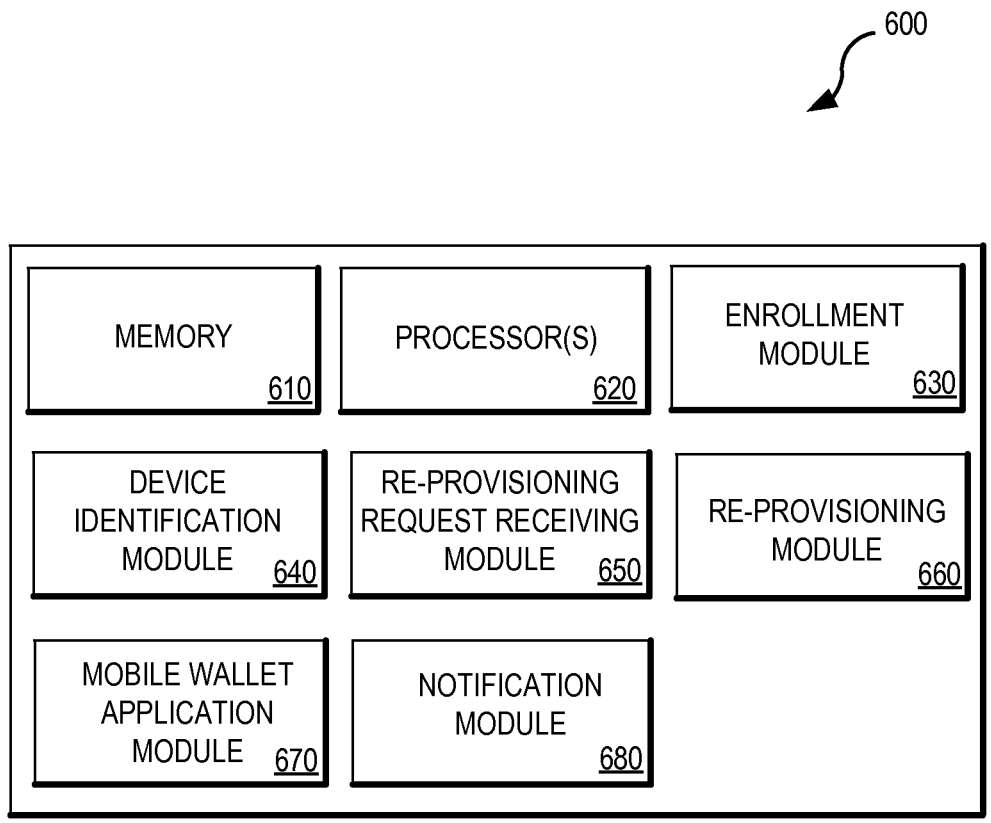
FIG. 6 is a block diagram illustrating exemplary components that may be included in a mobile financial wallet.

FIG. 6 is a block diagram illustrating exemplary components that may be included in a mobile financial wallet. According to the embodiments shown in FIG. 6, the mobile financial management system 600 may include memory 610, one or more processors 620, enrollment module 630, device identification module 640, re-provisioning request receiving module 650, re-provisioning module 660, mobile wallet application module 670, and notification module 680.

Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, the functionality associated with the mobile wallet application module 670 and enrollment module 630 may be incorporated into a single mobile wallet enrollment application module. As another example, in one embodiment, the device identification module 640 can be separated into a device information collection module for collecting information from a user computing device, device fingerprinting module for creating a profile of a user computing device, and a device associating module for associating the device fingerprint with a user.

Memory 610 can be any device, mechanism, or populated data structure used for storing information. In accordance with some embodiments of the present invention, memory 610 can encompass any type of, but is not limited to, volatile memory, nonvolatile memory and dynamic memory. For example, memory 610 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 610 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 610.

Memory 610 may be used to store instructions for running one or more applications or modules on processor(s) 620. For example, memory 610 could be used in one or more embodiments to house all or some of the instructions needed to execute the functionality of enrollment module 630, device identification module 640, re-provisioning request receiving module 650, re-provisioning module 660, mobile wallet application module 670, and notification module 680.

Enrollment module 630 may be configured to enroll the payment instruments with the mobile wallet. In doing so, enrollment module may be configured to provision the payment instruments to the mobile device using any methods known in the art. In some embodiments, the enrollment module is configured to provision the payment instruments by documenting the plurality of payment instruments in a central repository such as a database, and associating the payment instruments with the user computing device.

Device identification module 640 may be configured to collect device characteristics from a user device, create a device fingerprint, and identify when a user is using a new or unregistered computing device. Device identification module 640 may compare characteristics of devices to identify if a user is using a new user computing device. Device identification module 640 may be used in authenticating the user.

Re-provisioning request receiving module 650 may be configured to receive and process re-provisioning requests from users. The re-provisioning request receiving module 650 may determine which payment instruments can be re-provisioned automatically and which payment instruments will require notification to the issuers. For example, re-provisioning request receiving module 650 may determine the identity of the issuers of the various payment instruments, and identify which issuers have pre-negotiated agreements with the provider of the mobile wallet and which issuers the user has provided authorization to access the user account. Payment instruments identified by the re-provisioning request receiving module 650 with issuers lacking pre-existing relationships or user authorization to access the account may be identified to the notification module 690 as requiring issuer notifications to invoke re-provisioning processes.

Re-provisioning module 660 may be configured to process re-provisioning requests. The re-provisioning module may re-provision the payment instruments in the mobile wallet identified by the re-provisioning request receiving module 650 as capable of being re-provisioned by the mobile wallet provider. The re-provisioning module 660 may be configured to re-associate payment instruments with a new user computing device. Re-associating may include provisioning payment instruments to a new user computing device. This may include processes used in provisioning. Re-provisioning module 660 may be further configured to cancel payment instruments. Re-provisioning module 660 may be further configured to reissue payment instruments in the mobile wallet. Re-provisioning module 660 may be further configured to arrange for mailing physical payment instruments to the user.

Notification module 690 may be configured to notify the issuers of payment instruments in the mobile wallet that will not be re-provisioned, or requested on behalf of the user, by the mobile wallet provider. The notification may include an email, a text message, a phone call, a posting on an appropriate website and/or other means.

Mobile wallet application module 670 may be configured to provide a downloadable application for enabling a mobile wallet on a user computing device, transmitting the application to the user computing device. The mobile wallet application 670 may be further configured to receive, from the user, a request to download the application to a second user computing device.

Figure 7:
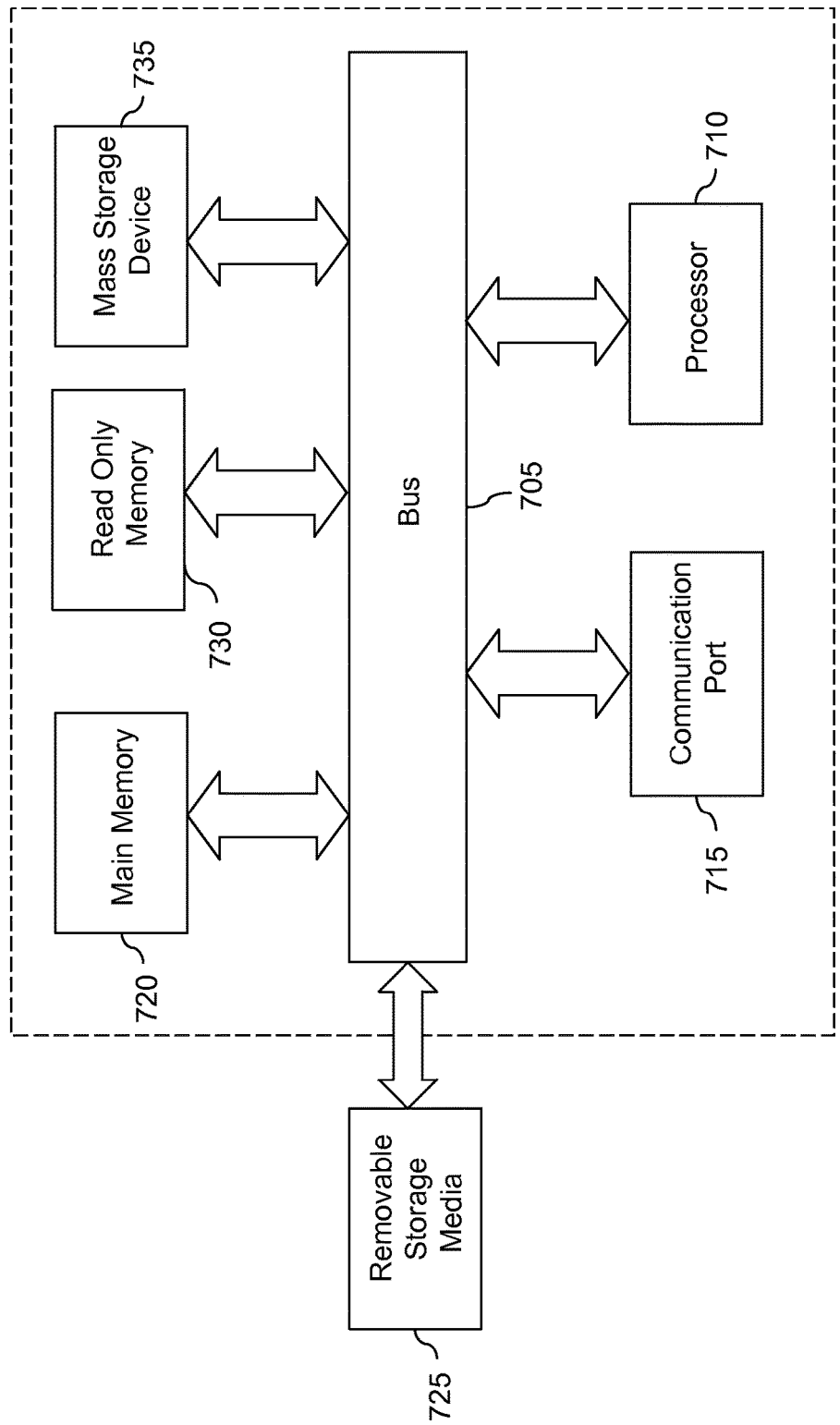
FIG. 7 illustrates an example of a computer system within which some embodiments of the present invention may be utilized.

FIG. 7 illustrates an example of a computer system within which some embodiments of the present invention may be utilized.

Exemplary Computer System Overview

Embodiments of the present invention include various steps and operations. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 705, at least one processor 710, at least one communication port 715, a main memory 720, a removable storage media 725, a read only memory 730, and a mass storage 735.

Processor(s) 710 can be any known processor, such as, but not limited to, an Intel® Itanium® or Itanium 2® processor(s), or AMD® Opteron® or Athlon MP® processor(s), or Motorola® lines of processors. Communication port(s) 715 can be any of an RS-232 port for use with a modem based dialup connection, a 10/100 Ethernet port, or a Gigabit port using copper or fiber. Communication port(s) 715 may be chosen depending on a network such a Local Area Network (LAN), Wide Area Network (WAN), or any network to which the computer system 700 connects.

Main memory 720 can be Random Access Memory (RAM), or any other dynamic storage device(s) commonly known in the art. Read only memory 730 can be any static storage device(s) such as Programmable Read Only Memory (PROM) chips for storing static information such as instructions for processor 710.

Mass storage 735 can be used to store information and instructions. For example, hard disks such as the Adaptec® family of SCSI drives, an optical disc, an array of disks such as RAID, such as the Adaptec family of RAID drives, or any other mass storage devices may be used.

Bus 705 communicatively couples processor(s) 710 with the other memory, storage and communication blocks. Bus 705 can be a PCI/PCI-X or SCSI based system bus depending on the storage devices used.

Removable storage media 725 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Terminology

Brief definitions of terms used throughout this application and attached appendix are given below.

The terms "connected" or "coupled" and related terms are used in an operational sense and are not necessarily limited to a direct connection or coupling.

The term "embodiments," phrases such as "in some embodiments," "in various embodiments," and the like, generally mean the particular feature(s), structure(s), method(s), or characteristic(s) following or preceding the term or phrase is included in at least one embodiment of the present invention, and may be included in more than one embodiment of the present invention. In addition, such terms or phrases do not necessarily refer to the same embodiments.

If the specification states a component or feature "may", "can", "could", or "might" be included or have a characteristic, that particular component or feature is not required to be included or have the characteristic.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, and/or a module can include one or more application programs.

The term "responsive" includes completely and partially responsive.

Various embodiments of the present invention may be implemented using a combination of one or more modules. For example, some embodiments provide for a graphical user interface module to generate one or more graphical user interface screens configured to take instructions, receive design objectives, and convey results, a general-purpose or special-purpose "communications module" for interfacing with one or more other modules and devices (e.g., a fabrication device or fabrication control module), a "design module" to receive and process a set of constraints that mathematically express the design objectives, computation and fabrication limitations, a "fabrication module" to control the fabrication devices in order to fabricate the devices using liquid deposition photolithography, as well as other modules for providing various functionality needed by embodiments of the present invention. Still yet, some embodiments may incorporate two or more of these modules into a single module and/or associate a portion of the functionality of one or more of these modules with a different module.

Various modifications and additions can be made to the embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations and all equivalents thereof.

What is claimed is:

1. A method of managing a mobile wallet, comprising:
   providing, by a server, an application for download for enabling a mobile wallet on a first computing device associated with a user;
   receiving, by the server, a first request to download the application to the first computing device;
   in response to receiving the first request to download the application to the first computing device, transmitting, by the server, the application to the first computing device;
   registering, by the server, the first computing device by associating plug-ins, an operating system and browsing history of the first computing device with an identifier associated with the user;
   continuously collecting, by the server, the plug-ins, the operating system and the browsing history;
   receiving, by the server via the application, a request to enroll a plurality of payment instruments in the mobile wallet;
   enrolling, by the server via the application, the plurality of payment instruments in the mobile wallet, wherein enrolling the plurality of payment instruments in the mobile wallet comprises provisioning the plurality of payment instruments to the first computing device;
   receiving, by the server, a second request to download the application for enabling the mobile wallet on a second computing device associated with the user;
   determining that the second computing device is different than the first computing device by:
      accessing, by the server, a user profile associated with the user,
      determining, by the server via the user profile, whether the user associated with the second computing device has previously downloaded the application and whether the user has registered the second computing device, and
      comparing, by the server, the plug-ins, the operating system and the browsing history of the first computing device with plug-ins, an operating system and browsing history of the second computing device;
   in response to receiving the second request to download the application to the second computing device and determining that the second computing device is different than the first computing device: re-provisioning, by the server, at least a first group of the plurality of payment instruments to the second computing device.

2. The method of claim 1, wherein provisioning the plurality of payment instruments comprises documenting the plurality of payment instruments in a central repository and associating the plurality of payment instruments with the first computing device.

3. The method of claim 1, wherein re-provisioning the at least the first group of the plurality of payment instruments comprises re-associating the at least the first group of the plurality of payment instruments with the second computing device.

4. The method of claim 1, wherein the method further comprises:
in response to the user providing authorization, re-provisioning a second group of the plurality of payment instruments.

5. The method of claim 1, wherein re-provisioning the at least the first group of the plurality of payment instruments comprises re-provisioning the plurality of payment instruments in the mobile wallet.

6. The method of claim 1, wherein the at least the first group of the plurality of payment instruments comprises payment instruments issued by a provider of the mobile wallet, and wherein the method further comprises notifying issuers of a second group of the plurality of payment instruments of the re-provisioning.

7. The method of claim 6, wherein the at least the first group of the plurality of payment instruments further comprises payment instruments issued by affiliated organizations of the provider of the mobile wallet.

8. The method of claim 1, wherein the method further comprises:
receiving, from the user, authorization and information to re-provision the plurality of payment instruments.

9. The method of claim 1, wherein enrolling the plurality of payment instruments in the mobile wallet further comprises receiving information from an existing payment instrument.

10. The method of claim 9, wherein receiving the information from the existing payment instrument comprises receiving an image of the existing payment instrument, extracting the information from the image, and recording the information.

11. The method of claim 1, further comprising storing the application in a secure element on the first computing device.

12. The method of claim 1, wherein at least one of the plurality of payment instruments has no physical counterpart.

13. A non-transitory, computer readable medium comprising a set of instructions that, when executed by a processor, cause the processor to perform operations comprising:
providing an application for download for enabling a mobile wallet on a first computing device associated with a user;
receiving a first request to download the application to the first computing device;
in response to receiving the first request to download the application to the first computing device, transmit the application to the first computing device;
registering the first computing device by associating plug-ins, an operating system and browsing history of the first computing device with an identifier associated with the user;
continuously collecting, by a server, the plug-ins, the operating system and the browsing history;
receiving, via the application, a request to enroll a plurality of payment instruments in the mobile wallet;
enrolling, by the server via the application, the plurality of payment instruments in the mobile wallet, wherein enrolling the plurality of payment instruments in the mobile wallet comprises provisioning the plurality of payment instruments to the first computing device;
receiving a second request to download the application for enabling the mobile wallet on a second computing device associated with the user;
determining that the second computing device is different than the first computing device by:
accessing a user profile associated with the user,
determining, via the user profile, whether the user associated with the second computing device has previously downloaded the application and whether the user has registered the second computing device, and
comparing the plug-ins, the operating system and the browsing history of the first computing device with plug-ins, an operating system and browsing history of the second computing device;
in response to receiving the second request to download the application to the second computing device and determining that the second computing device is different than the first computing device: re-provisioning at least a first group of the plurality of payment instruments to the second computing device,
wherein the at least the first group of the plurality of payment instruments comprises payment instruments issued by a provider of the mobile wallet; and
notifying issuers of a second group of the plurality of payment instruments of the re-provisioning.

14. A system for managing a mobile wallet, comprising:
a memory storing a set of instructions; and
at least one processor interacting with the memory, wherein the set of instructions, when executed by the at least one processor, cause the at least one processor to perform operations comprising:
providing an application for download for enabling a mobile wallet on a first computing device associated with a user;
receiving a first request to download the application to the first computing device;
in response to receiving the first request to download the application to the first computing device, transmitting the application to the first computing device;
registering the first computing device by associating plug-ins, operating system and browsing history of the first computing device with an identifier associated with the user;
continuously collecting, by a server, the plug-ins, the operating system and the browsing history;
receiving, via the application, a request to enroll a plurality of payment instruments in the mobile wallet;
enrolling, by the server via the application, the plurality of payment instruments in the mobile wallet, wherein enrolling the plurality of payment instruments in the mobile wallet comprises provisioning the plurality of payment instruments to the first computing device;
receiving a second request to download the application for enabling the mobile wallet on a second computing device;

determining that the second computing device is different than the first computing device by:
    accessing a user profile associated with the user,
    determining, via the user profile, whether the user associated with the second computing device has previously downloaded the application and whether the user has registered the second computing device, and
    comparing the plug-ins, the operating system and the browsing history of the first computing device with plug-ins, operating system and browsing history of the second computing device;
in response to receiving the second request to download the application to the second computing device and determining that the second computing device is different than the first computing device;
re-provisioning at least a first group of the plurality of payment instruments to the second computing device,
    wherein the at least the first group of the plurality of payment instruments comprises payment instruments issued by a provider of the mobile wallet; and
notifying issuers of a second group of the plurality of payment instruments of the re-provisioning.

15. The non-transitory, computer readable medium of claim 13, wherein the operations of provisioning include the operations of:
    documenting the plurality of payment instruments in a central repository,
    associating the plurality of payment instruments with the first computing device,
    wherein the operations of re-provisioning the at least the first group of the plurality of payment instruments include the operations of re-associating the at least the first group of the plurality of payment instruments with the second computing device.

16. The non-transitory, computer readable medium of claim 13, wherein the identifier is a membership number of a provider of the application.

17. The system of claim 14, wherein the operations to provision the plurality of payment instruments comprise documenting the plurality of payment instruments in a central repository and associating the plurality of payment instruments with the first computing device.

18. The system of claim 14, wherein the operations to re-provision the at least the first group of the plurality of payment instruments comprise re-associating the at least the first group of the plurality of payment instruments with the second computing device.

19. The system of claim 14, wherein the identifier is a membership number of a provider of the application.

20. The method of claim 1, wherein the identifier is a membership number of a provider of the application.

* * * * *